United States Patent [19]
Laug et al.

[11] Patent Number: 5,617,958
[45] Date of Patent: Apr. 8, 1997

[54] VERTICAL SPORTS RACK

[75] Inventors: Tamara Laug, 4606 Greenbriar, Boulder, Colo. 80303; Robert L. Bromley, Broomfield, Colo.

[73] Assignees: Tamara Laug; Jake Thamm, both of Boulder, Colo.

[21] Appl. No.: 351,671

[22] Filed: Dec. 8, 1994

[51] Int. Cl.⁶ ........................................................ A47F 7/00
[52] U.S. Cl. .............................. 211/13; 211/24; 211/60.1; 211/70.5; 248/125.3; 248/129; 248/297.21
[58] Field of Search ...................... 211/13, 17, 60.1, 211/70.5, 70.6, 22, 24; 248/910, 125.1, 125.2, 125.3, 297.21, 129, 229.1, 229.16

[56] References Cited

U.S. PATENT DOCUMENTS

| D. 295,471 | 5/1988 | Lindskog | D6/462 |
|---|---|---|---|
| 298,233 | 5/1884 | Richards | 248/125.2 |
| 625,271 | 5/1899 | Lang | 248/297.21 |
| 907,171 | 12/1908 | Knight | 211/70.2 |
| 1,660,479 | 2/1928 | Crowe | 211/70.2 |
| 1,783,749 | 12/1930 | Roehl | 248/125.3 |
| 4,163,537 | 8/1979 | Mourgue | 248/297.21 |
| 4,192,424 | 3/1980 | Allsop | 248/297.21 |
| 4,203,373 | 5/1980 | Conti | 248/297.21 |
| 4,306,661 | 12/1981 | Allsop | 248/297.21 |
| 4,688,685 | 8/1987 | Brace | 211/70.5 |
| 4,732,283 | 3/1988 | Schmidt | 211/70.5 |
| 4,815,734 | 3/1989 | Verhulst | 248/297.21 |
| 5,000,467 | 3/1991 | Becca | 248/129 |
| 5,044,505 | 9/1991 | Spratt | 211/22 |
| 5,207,405 | 5/1993 | Cobb | 248/125.3 |
| 5,207,407 | 5/1993 | Fitzsimmons et al. | 248/910 |
| 5,307,944 | 5/1994 | Reedy | 211/70.5 |

FOREIGN PATENT DOCUMENTS 222842 8/1962 Austria .................................. 211/13

Primary Examiner—Alvin C. Chin-Shue
Assistant Examiner—Anita M. King
Attorney, Agent, or Firm—Lee R. Osman

[57] ABSTRACT

A slanted main strut about six feet long is supported by a base having rollers. The top of the slanted main strut allows the base to be rocked back on its rollers for ground transport. Vertical grooves in the slanted main strut support slidable braces. Each brace supports a chosen equipment holder including a golf bag ring, a ski brace, a bicycle support bar, a ball container, and a boot tray.

16 Claims, 4 Drawing Sheets

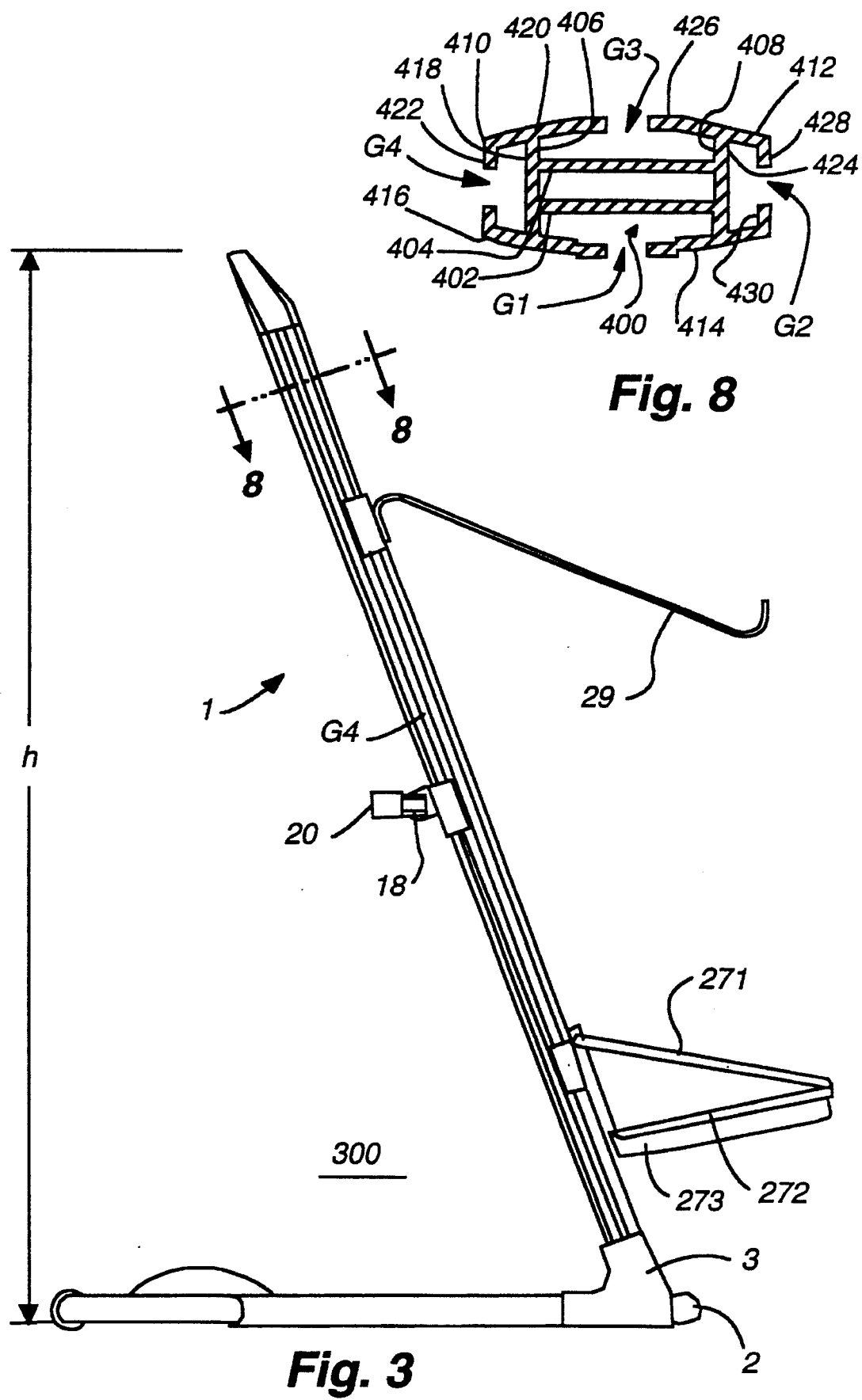

VERTICAL SPORTS RACK

FIELD OF INVENTION

The present invention relates to vertical, portable sports racks capable of storing bicycles, skis, golf bags, skates, and the like.

BACKGROUND OF THE INVENTION

It is well known in the art to provide a versatile sports rack capable of storing bicycles, skis, golf bags, skates, and the like. Such a sports rack is disclosed in U.S. Pat. No. 5,044,505 (1991) to Spratt. Spratt teaches a horizontally arranged storage rack for bikes, surf boards, shoes, and the like. Skis can be hung vertically from a top horizontal bar. The entire apparatus is supported by a pair of floor to ceiling support rods. Vertical adjustment can be done with wing nut clamps riding on the main support rods. A bicycle body clamp to repair a bicycle projects to the side from a support rod.

Spratt requires a pair of floor to ceiling support rods for providing structural integrity. Thus, the Spratt device cannot be easily moved. Also, the Spratt device stores the items horizontally which uses up considerably more floor space than storing the same items vertically.

U.S. Pat. No. 907,171 (1908) to Knight discloses an inclined rack for golf clubs, umbrellas, brushes, and the like. Numerous ledges protrude from the single vertical inclined upright rod. Numerous loops also protrude above each ledge so that an umbrella could rest in a loop and a ledge below and rest in a perpendicular position. This is the closest known prior art. It does not teach adjustable slots, a bike brace, nor a ski bracket. The Knight device does not have rollers for ease of transport along the ground. Indeed, the Knight device is not designed as a heavy sports equipment storage rack. Rather, it is designed primarily as an umbrella stand.

There is an unmet need in the marketplace for a vertical storage device like Knight which can vertically store similar heavy sports equipment as does Spratt. The present vertical sports rack is a hybrid between Knight and Spratt. Other unique features of the vertical sports rack not taught by either Knight or Spratt include a plurality of vertical grooves functioning to provide versatile placement of each support brace.

SUMMARY OF THE INVENTION

The main object of the present invention is to provide a compact vertical sports equipment storage rack which can hold bicycles, skis, a golf bag, skates, sports balls, and other items of choice.

Another object of the present invention is to provide vertical adjustment means for all the various sports equipment clamps thereby creating a versatile storage system.

Yet another object of the present invention is to provide a means for ground transport of a fully loaded vertical sports rack.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 3 is a left side plan view of the embodiment of FIG. 2.

FIG. 8 is a cross sectional view of the main support strut of the preferred embodiment.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
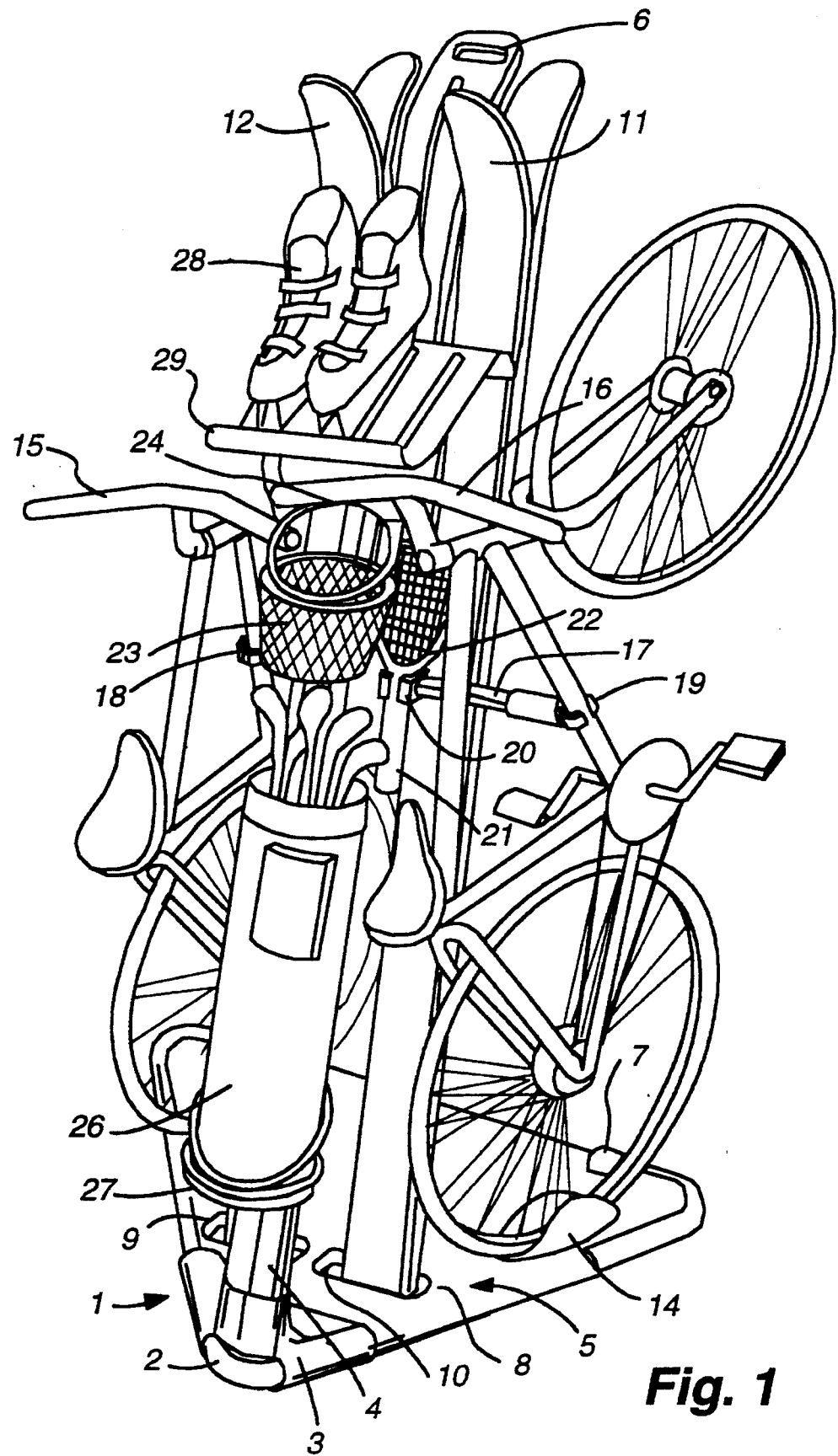
FIG. 1 is a front perspective view of the preferred embodiment loaded with sports equipment.
Figures 2, 9:
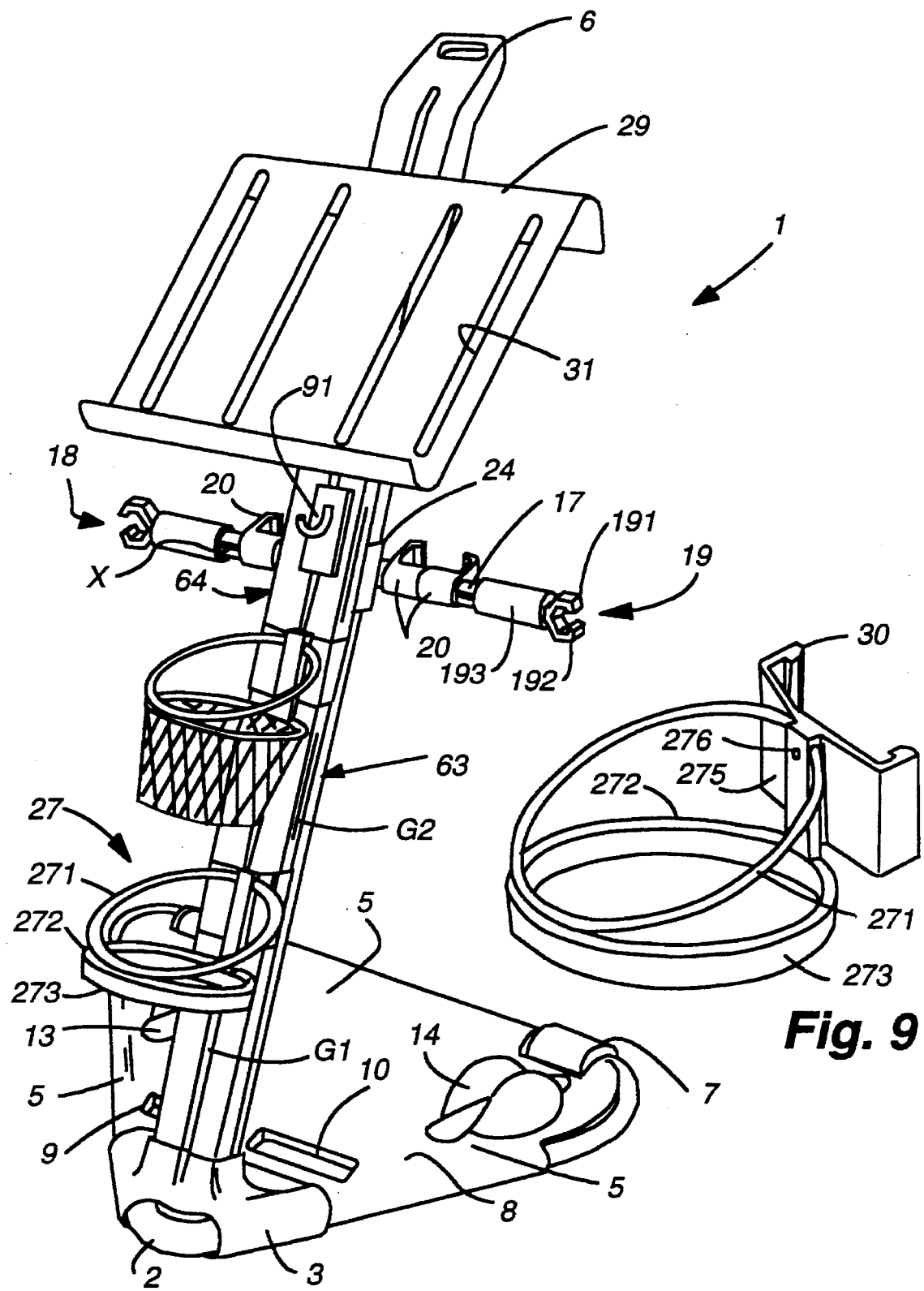
FIG. 2 is the same view as FIG. 1 but with the vertical sports rack unloaded.
FIG. 9 is a top perspective view of a dual horizontal rim and vertical strut fixture.
Figure 7:
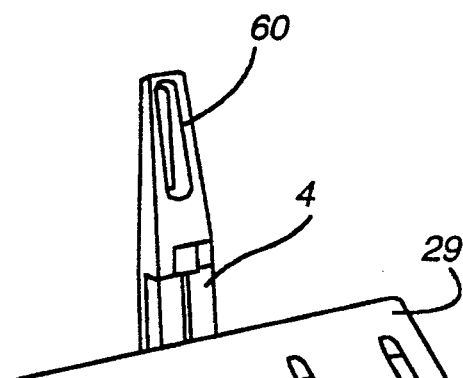
FIG. 7 is a top perspective view of a first member of a two member ski clamp.

Referring first to FIG. 1 the vertical sports stand 1 has a tubular support base 2 shaped as a triangle. A vertical brace 3 snaps onto the tubular support base 2. A main vertical strut 4 supports all the various sports equipment braces. The handle 6 is used to tilt the vertical sports stand 1 onto the rollers 7 for ground transport. A base pan 8 is releasably fastened to the tubular support base 2 at 5. The base pan 8 has ski pockets 9, 10 to support skis 11, 12. Wheel pockets 13, 14 are used to support bicycles 15, 16. The horizontal bar 17 supports bicycle frame clamps 18, 19 at each end. A pair of parallel clamps 20 (see FIG. 7) support a tennis racket 22. A ball basket 23 is supported by a vertical brace 275 (see FIG. 9). The ball basket 23 has a pair of horizontal rims 271, 272 that fit into the vertical brace 275 ad universal brace 30 via bolts 276 as shown in FIG. 9. FIG. 9 has substituted the golf bag bucket 273 for the ball basket 23. A golf bag 26 is supported by ring brace 27. In-line skates 28 are supported by boot tray 29. The universal brace 30 shown in FIG. 5 supports the boot tray 29.

Referring next to FIG. 2 it can be seen that boot tray 29 has slots 31 for holding ice skates or in-line skates and the like. Each pair of parallel clamps 20 has an identical member opposing it. The distance between each member 20 is adjustable by sliding either member along the horizontal bar 17 in grooves X, Y.

The frame clamps 18, 19 are identical. A first jaw 191 closes against a second jaw 192 by means of a threaded collar 193 in a known manner. The frame clamps 18, 19 are rotatable as shown in FIG. 3.

The ring brace 27 has an upper support ring 271 and a lower support ring 272. The lower support ring 272 is bolted into the vertical brace 275 with bolts 276 (FIG. 9). A bucket 273 attached to lower support ring 272 holds the bottom of a golf bag 26 as shown in FIG. 1.

The main strut 4 has a cross section as best shown in FIG. 8. The main vertical strut 4 comprises an internal framework 400 having a pair of coextensive laterally extending parallel brace members 402, 404, as well as structural end members 406, 408 positioned transverse to the laterally extending members 402, 404, with one structural end member 406, 408 at either end of said laterally extending members to form a general "H" shape. At the opposing ends of each of the transverse structural members is mounted a generally L-shaped cover member 410, 412 414, 416. Each L-shaped cover member extends partially around the framework, and in conjunction with the adjacent L-shaped cover member forms one of the grooves used to support the universal brace 30, the horizontal bar support 24, and the general purpose hook 91.

The L-shaped cover member 410 attached to the outer end 418 of transverse structural member 406 has the long leg 420 of the L-shaped cover member 406 extending along the lateral dimension of the framework 400, and the short leg 422 extending substantially parallel to the length of the transverse structural member 406. Symmetrically, the L-shaped cover member 412 attached to the outer end 424 of transverse structural member 408 also has its longer leg 426 extending along the lateral dimension of the frame structure 400, and its short leg 428 extending along a direction substantially parallel to the length of the transverse structural member 408.

The long legs 420, 426 of the L-shaped cover members 410, 412 extend toward one another and terminate to form the gap G3. The short leg 430 of the L-shaped cover members 414, adjacent to member 412, extends toward the short leg 428, and terminates to form gap G2. Gaps G1 and G4 are formed in an identical manner with the other L-shaped cover members 414, 416. The L-shaped cover members form an outer surface defining grooves G1, G2, G3, and G4.

The internal frame member 400 of the main vertical strut 4 provides adequate rigid structure to minimize torsional and longitudinal deflection. The internal framework 400, in conjunction with the L-shaped cover members 410, 412, 414, 416 define a main vertical strut 4 having longitudinally extending grooves G1, G2, G3, and G4 for receiving the various braces which are used to support objects on the main strut 4. The internal framework member provides strength while the L-shaped cover members provide the grooves for receiving and supporting the braces.

Each of the grooves G1 through G4 are substantially enclosed channels. G1 is defined by the laterally extending brace member 402 on one side, the transverse structural members 406, 408 on opposing sides, and the L-shaped cover members 416 and 414 on the third side. The channel associated with groove G2 is defined by transverse structural member 408 on one side, the long legs of adjacent L-shaped cover members 412, 414 on opposing sides, and the short legs of adjacent L-shaped cover members 412, 414 on the fourth side. G3 is defined analogously to G1, and groove G4 is defined analogously to groove G2.

Figure 5:
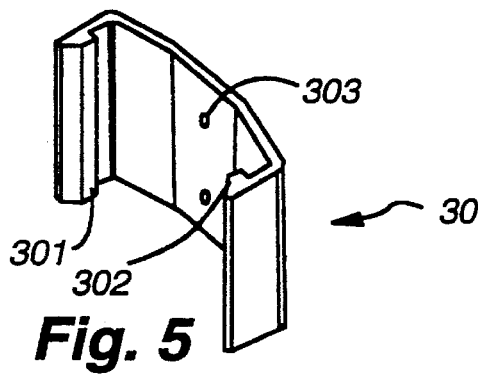
FIG. 5 is a top perspective view of a universal sliding brace.
Figure 6:
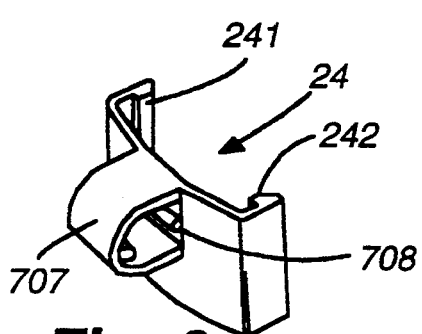
FIG. 6 is a top perspective view of a sliding horizontal bar brace.

The vertical grooves $G_1$, $G_2$, $G_3$, $G_4$ of main vertical strut 4 enable all the supports to be individually adjusted to the desired height. In FIG. 5 the universal brace 30 has tongues 301, 302 which ride in grooves $G_2$, $G_4$. Holes 303 enable any type of support to be bolted therethrough. In FIG. 6 the horizontal bar support 24 has tongues 241, 242 which also ride in grooves $G_2$, $G_4$. Tongues 707, 708 of horizontal bar support 24 ride in grooves X, Y of horizontal bar 17. A general purpose hook 91 slides up and down groove $G_1$ as seen in FIG. 2.

Referring next to FIG. 3 it can be seen that a variety of uses can be made of space 300 such as mounting the ball basket 23 of FIG. 1 in the space. Height is substantially similar to the length of the adult snow skis shown in FIG. 1.

Figure 4:
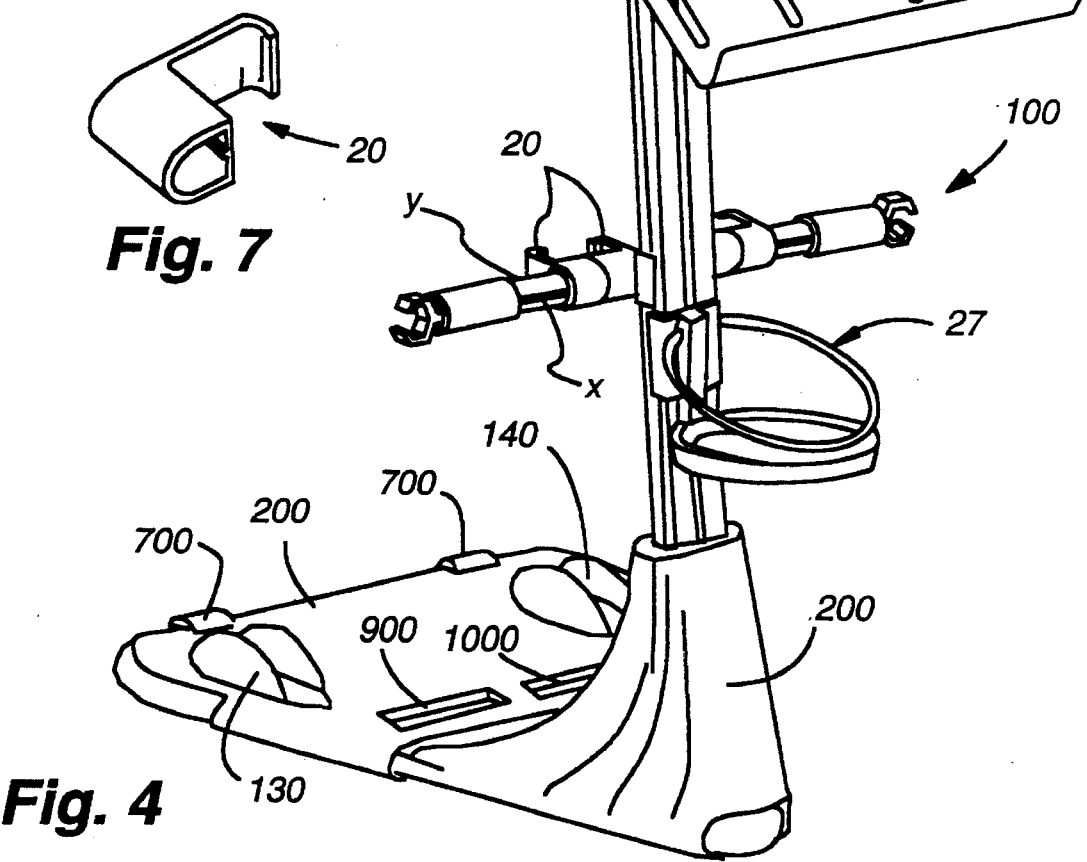
FIG. 4 is a left side perspective view of an alternate embodiment having a one piece base

Referring next to FIG. 4 the alternate embodiment rack 100 differs primarily by having a one piece base 200. The base 200 is preferably a single injection molded piece. The wheel pockets 130, 140 are functionally equivalent to wheel pockets 13, 14. The ski pockets 900, 1000 are functionally equivalent to ski pockets 9, 10. Rollers 700 are functionally equivalent to rollers 7. Handle 60 is functionally equivalent to handle 6.

Referring to FIG. 8 a traditional tongue-in-groove arrangement is shown.

Although the present invention has been described with reference to preferred embodiments, numerous modifications and variations can be made and still the result will come within the scope of the invention. No limitation with respect to the specific embodiments disclosed herein is intended or should be inferred.

We claim:

1. A vertical sports rack comprising:
   a base having a flat surface for contact with a floor, and having a slanted support hub angled inward toward a central area of the base;
   said slanted support hub having means for supporting a main strut;
   a main strut angled inward toward said central area and defining a front face and a back face, and having a plurality of vertical grooves;
   a brace means attached to said main strut on said back face having tongues slidingly engaged in said vertical grooves;
   a horizontal bar having opposing ends extending laterally of said main strut and being affixed to said brace means, said horizontal bar also having a bicycle frame clamp at each of said ends.

2. The vertical sports rack of claim 1 wherein said means for supporting the main strut further comprises a hole.

3. The vertical sports rack of claim 1 wherein said base defines a wheel pocket positioned generally below said opposing ends of said bar.

4. The vertical sports rack of claim 1 further comprising a universal sliding brace slidably engaging at least one of said plurality of grooves and positioned over said front face.

5. The vertical sports rack of claim 1 further comprising a golf bag support ring attached to said main strut.

6. A rack as defined in claim 1 further comprising an additional clamp positioned on said horizontal bar intermediate said opposing ends.

7. A vertical sports rack comprising:
   a base stand;
   a vertical strut affixed to said base stand in a slanted manner toward a center of the base stand, said vertical strut further comprising a plurality of vertical grooves;
   a plurality of vertically sliding braces slidably engaging said vertical grooves; and
   one of said plurality of braces supporting a horizontally oriented bar, said horizontally oriented bar extending laterally from the vertical strut and having opposing ends, each end including a bicycle clamp.

8. The vertical sports rack of claim 7 wherein said base stand further comprises rollers, and said vertical strut further comprises a handle to tilt the vertical sports rack onto the rollers for ground transport.

9. The vertical sports rack of claim 7 wherein the vertical strut further comprises a ski clamp mounted on said horizontally oriented bar intermediate said opposing ends.

10. The vertical sports rack of claim 7 further comprising a boot tray attached to one of said sliding braces.

11. The vertical sports rack of claim 7 further comprising a basket-shaped ball container attached to said sliding braces.

12. A vertical sports rack comprising:

a base having a flat surface for contact with a floor;

said base further comprising a slanted support hub angled inwardly toward a central area of the base;

said slanted support hub having means for supporting a main strut;

a main strut having a plurality of vertical grooves;

a horizontal bar support having tongues slidingly engaged in said vertical grooves; and a horizontal bar having opposing ends affixed at a central position to the horizontal bar support and extending laterally outwardly from said main strut;

a bicycle frame clamp attached at each of said opposing ends of said horizontal bar; and a first ski clamp positioned on said horizontal bar between said main strut and one of said ends, and a second ski clamp positioned on said horizontal bar between said main strut and the other one of said ends.

13. A vertical sports rack comprising:

a base having a flat surface for contact with a floor, and having a slanted support hub angled inward toward a central area of the base;

said slanted support hub having means for supporting a main strut;

a main strut angled inward toward said central area and defining a front face facing away from said central area, and a back face facing toward a central area, and having a plurality of vertical grooves;

a brace means attached to said main strut on said back face having tongues slidingly engaged in said vertical grooves;

a horizontal bar having opposing ends extending laterally of said main strut and being affixed to said brace means, said horizontal bar also having a bicycle frame clamp at each of said ends.

14. A vertical sports rack comprising:

a base having a flat surface for contact with a floor, and having a slanted support hub angled inward toward a central area of the base;

said slanted support hub having means for supporting a main strut;

a main strut angled inward toward said central area and having an internal framework structure comprising:

a first laterally extending brace member having opposing ends;

a transversely extending structural end member attached to either end of said laterally extending brace member, each structural member having opposing ends;

an L-shaped cover member mounted at each opposing end of said structural members, said L-shaped cover members forming an outer surface defining a groove; and a brace for attachment to said main strut, said brace defining a tongue positioned thereon to correspond to the location of the groove formed in said main strut, said tongue being positioned in said groove to attach said brace to said main strut.

15. A vertical sports rack as defined in claim 14, wherein each of said L-shaped cover members comprises a long leg attached to a short leg, with said L-shaped cover members configured on said internal frame structure such that the long legs of each of said L-shaped cover members are adjacent one another, and said short legs of each of said L-shaped cover members are adjacent to one another.

16. A vertical sports rack as defined in claim 15, wherein each of said adjacent long legs of said adjacent L-shaped cover members are spaced apart to form a first groove, and each of said adjacent short legs of said adjacent L-shaped cover members are spaced apart to form a second groove.

* * * * *